US012339690B2

(12) United States Patent
Onódy et al.

(10) Patent No.: US 12,339,690 B2
(45) **Date of Patent: *Jun. 24, 2025**

(54) HIGH-SPEED LOW-IMPEDANCE BOOSTING LOW-DROPOUT REGULATOR

(71) Applicant: Skyworks Solutions, Inc., Irvine, CA (US)

(72) Inventors: Péter Onódy, Budapest (HU); Tamás Marozsák, Budapest (HU); Viktor Zsolczai, Szolnok (HU); András V. Horváth, Budapest (HU)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,479

(22) Filed: Nov. 15, 2023

(65) Prior Publication Data

US 2024/0134404 A1 Apr. 25, 2024

Related U.S. Application Data

(63) Continuation of application No. 18/081,024, filed on Dec. 14, 2022, now Pat. No. 11,822,360, which is a continuation of application No. 17/123,358, filed on Dec. 16, 2020, now Pat. No. 11,556,144.

(51) Int. Cl.
*G05F 1/575* (2006.01)
*G05F 1/59* (2006.01)

(52) U.S. Cl.
CPC ................ *G05F 1/575* (2013.01); *G05F 1/59* (2013.01)

(58) Field of Classification Search
CPC .................................. G05F 1/575; G05F 1/59
See application file for complete search history.

(56) References Cited

U.S. PATENT DOCUMENTS

| | | | |
|---|---|---|---|
| 7,091,709 | B2 | 8/2006 | Suzuki |
| 7,199,565 | B1 | 4/2007 | Demolli |
| 7,999,523 | B1 | 8/2011 | Caffee et al. |
| 8,947,112 | B2 | 2/2015 | Yamanobe |

(Continued)

FOREIGN PATENT DOCUMENTS

WO WO 2020/086150 A2 4/2020

OTHER PUBLICATIONS

Klomark, S., "Design of an Integrated Voltage Regulator", Institution for Systemteknik, Oct. 17, 2003, in 54 pages.

(Continued)

*Primary Examiner* — Jue Zhang
*Assistant Examiner* — Lakaisha Jackson
(74) *Attorney, Agent, or Firm* — Knobbe, Martens, Olson & Bear, LLP

(57) ABSTRACT

A method for regulating a voltage reference signal includes providing a first output current during a first interval and a boosted output current during a second interval to generate a low-dropout voltage reference signal based on a first power supply voltage, a second power supply voltage, and a reference voltage level. The method includes, during the second interval, compensating for a voltage drop caused by providing the boosted output current. The first output current may be provided in a first mode of operation. The boosted output current and voltage drop compensation may be provided in a boosted mode of operation.

20 Claims, 5 Drawing Sheets

(56) References Cited

U.S. PATENT DOCUMENTS

| | | | | |
|---|---|---|---|---|
| 9,261,892 | B2 | 2/2016 | Wang et al. | |
| 9,337,824 | B2 | 5/2016 | Piselli et al. | |
| 9,537,581 | B2 | 1/2017 | Mills et al. | |
| 9,625,925 | B2 | 4/2017 | Yan et al. | |
| 9,817,426 | B2 | 11/2017 | Chellappa | |
| 10,281,943 | B1 * | 5/2019 | Ho | G05F 1/575 |
| 10,296,026 | B2 | 5/2019 | Caffee et al. | |
| 10,784,860 | B1 | 9/2020 | Sakai | |
| 11,556,144 | B2 | 1/2023 | Onody et al. | |
| 11,822,360 | B2 | 11/2023 | Onody et al. | |
| 2005/0248331 | A1 | 11/2005 | Whittaker | |
| 2007/0241731 | A1 | 10/2007 | van Ettinger | |
| 2008/0054867 | A1 | 3/2008 | Soude et al. | |
| 2008/0238385 | A1 | 10/2008 | Nagata et al. | |
| 2008/0303496 | A1 | 12/2008 | Schlueter et al. | |
| 2009/0295360 | A1 | 12/2009 | Hellums | |
| 2010/0117699 | A1 | 5/2010 | Wu et al. | |
| 2010/0156362 | A1 | 6/2010 | Xie | |
| 2010/0156364 | A1 | 6/2010 | Cho et al. | |
| 2011/0068257 | A1 * | 3/2011 | Maeda | H04N 25/77 250/214 AL |
| 2011/0121802 | A1 | 5/2011 | Zhu | |
| 2013/0082671 | A1 | 4/2013 | Ivanov et al. | |
| 2015/0185747 | A1 | 7/2015 | Liu | |
| 2015/0198960 | A1 * | 7/2015 | Zhang | G05F 1/56 323/280 |
| 2015/0286232 | A1 * | 10/2015 | Parikh | G05F 1/56 323/273 |
| 2016/0224040 | A1 | 8/2016 | Peluso et al. | |
| 2016/0357206 | A1 | 12/2016 | Liu | |
| 2017/0093399 | A1 | 3/2017 | Atkinson et al. | |
| 2017/0115677 | A1 | 4/2017 | Caffee et al. | |
| 2017/0126329 | A1 | 5/2017 | Gorecki et al. | |
| 2017/0160757 | A1 * | 6/2017 | Yang | G05F 1/575 |
| 2017/0244395 | A1 | 8/2017 | Ojha et al. | |
| 2018/0017984 | A1 * | 1/2018 | Mayer | G05F 1/575 |
| 2018/0053463 | A1 | 2/2018 | Kong et al. | |
| 2018/0129234 | A1 | 5/2018 | Melgar et al. | |
| 2018/0173258 | A1 | 6/2018 | Singh | |
| 2019/0109529 | A1 | 4/2019 | Nobe et al. | |
| 2020/0144925 | A1 * | 5/2020 | Hashim | H02M 1/08 |

OTHER PUBLICATIONS

Onsemi, “Single 6 A High-Speed, Low-Side SiC MOSFET Driver”, Semiconductor Components Industries, LLC, 2017, Rev. Apr. 3, 2019, Publication Order No. NCP51705/D, in 21 pages.

Rohm Semiconductors, “Isolation voltage 2500Vrms 1ch Gate Driver Providing Galvanic Isolation”, Gate Driver Providing Galvanic Isolation Series, BM60054AFV-C Datasheet, Rev. 003, Apr. 23, 2018, in 42 pages.

International Search Report and Written Opinion for International Application No. PCT/US2021/063207, dated Apr. 7, 2022, in 8 pages.

* cited by examiner

HIGH-SPEED LOW-IMPEDANCE BOOSTING LOW-DROPOUT REGULATOR

Any and all applications for which a domestic priority claim is identified in the Application Data Sheet of the present application are hereby incorporated by reference under 37 CFR 1.57.

BACKGROUND

Field of the Invention

This disclosure is related to integrated circuits, and more particularly to voltage regulation circuits that provide a target voltage level to varying loads.

Description of the Related Art

In general, a low-dropout regulator is a DC linear voltage regulator that maintains a target output voltage level even when the supply voltage is very close to the target output voltage level. Referring to FIGS. 1 and 2, in an exemplary gate driver application, the load has a high variation. For example, most of the time, there is almost no load, but when the driver output changes state, the load is relatively high for a short period of time. Performance of a low-dropout regulator significantly affects dynamic performance of the gate driver. When input control signal $IN_N$ changes state, output transistor M1 should turn on quickly (e.g., in a few nanoseconds). However, charging of gate-to-source capacitance $C_{gsN}$ of output transistor M1 contributes to the propagation delay and a charging current of gate-to-drain capacitance $C_{gdN}$ limits the rate of change of the output voltage (i.e., dV/dt).

Conventional low-dropout regulator 102 includes a feedback path that is activated when regulator output voltage $V_{REG}$ temporarily drops in response to a change in the load. The feedback loop of conventional low-dropout regulator 102 is typically an order of magnitude slower than the expected duration of the switching transient. To handle the switching transient caused by a change of state of input control signal $IN_N$ without substantially impacting the dynamic performance of the gate driver, conventional low-dropout regulator 102 would need to have a bandwidth of 100 MHz. However, an embodiment of conventional low-dropout regulator 102 that has a bandwidth of 100 MHz would substantially increase the average current consumption of an associated integrated circuit system. Other conventional solutions include increasing the size of bypass capacitance $C_{BYPASS}$ to supply the necessary amount of current to stabilize the output voltage during the transient event. For example, bypass capacitance $C_{BYPASS}$ would store charge that is ten times the charge needed to charge gate-to-source capacitance $C_{gsN}$ and gate-to-drain capacitance $C_{gdN}$, e.g., bypass capacitance $C_{BYPASS}$ would have a capacitance in the nano-Farads range, which is incompatible with implementation on an integrated circuit, and may increase the number of pins, bill-of-materials, or printed circuit board area. Referring to FIG. 2, low-dropout regulator 102 includes booster amplifier 204, which generates boost current $i_{BOOST}$ in response to a change in the load. Boost current $i_{BOOST}$ supplements the response to the output voltage drop of operational amplifier 202 to charge capacitor $C_{COMP}$. However, booster amplifier 204 requires a drop of the regulator output voltage $V_{REG}$ to trigger generation of boost current $i_{BOOST}$ resulting in a substantial glitch of regulator output voltage $V_{REG}$. Accordingly, improved techniques for implementing a low-dropout regulator are desired.

SUMMARY OF EMBODIMENTS OF THE INVENTION

In at least one embodiment of the invention, a method for regulating a voltage signal includes providing a first output current during a first interval and a boosted output current during a second interval to generate a low-dropout regulated voltage signal based on a first power supply voltage, a second power supply voltage, and a reference voltage level. The method includes, during the second interval, compensating for a voltage drop caused by providing the boosted output current. The first output current may be provided in a first mode of operation. The boosted output current and voltage drop compensation may be provided in a boosted mode of operation.

In at least one embodiment of the invention, an integrated circuit includes a low-dropout regulator. The low-dropout regulator includes an input voltage reference node, an output regulated voltage node, a differential amplifier comprising a non-inverting input coupled to the input voltage reference node, and a feedback circuit coupled between the output regulated voltage node and an inverting input to the differential amplifier. The low-dropout regulator further includes a first device coupled between a first power supply node and an intermediate node and having a control node coupled to an output of the differential amplifier, a second device coupled between a second power supply node and the output regulated voltage node and having a second control node coupled to the intermediate node. The low-dropout regulator further includes a first load stage coupled between the output regulated voltage node and the first power supply node and responsive to a boost control signal and a compensation stage coupled between the second power supply node and the intermediate node and responsive to a complementary boost control signal.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
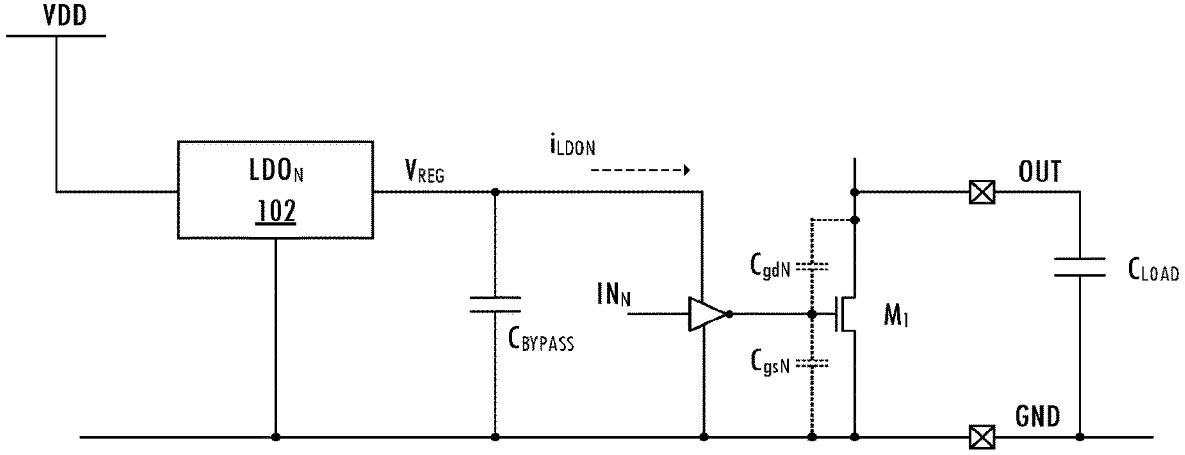
FIG. 1 illustrates a functional block diagram of an exemplary low-dropout regulator in an exemplary gate driver application.
Figure 2:
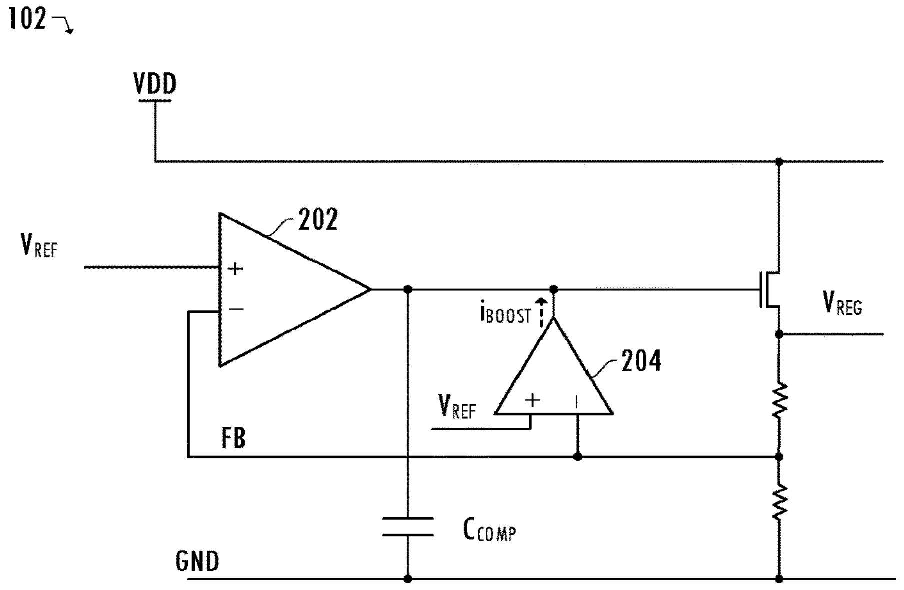
(PRIOR ART) FIG. 2
FIG. 2 illustrates a circuit diagram of an exemplary low-dropout regulator.
Figure 3:
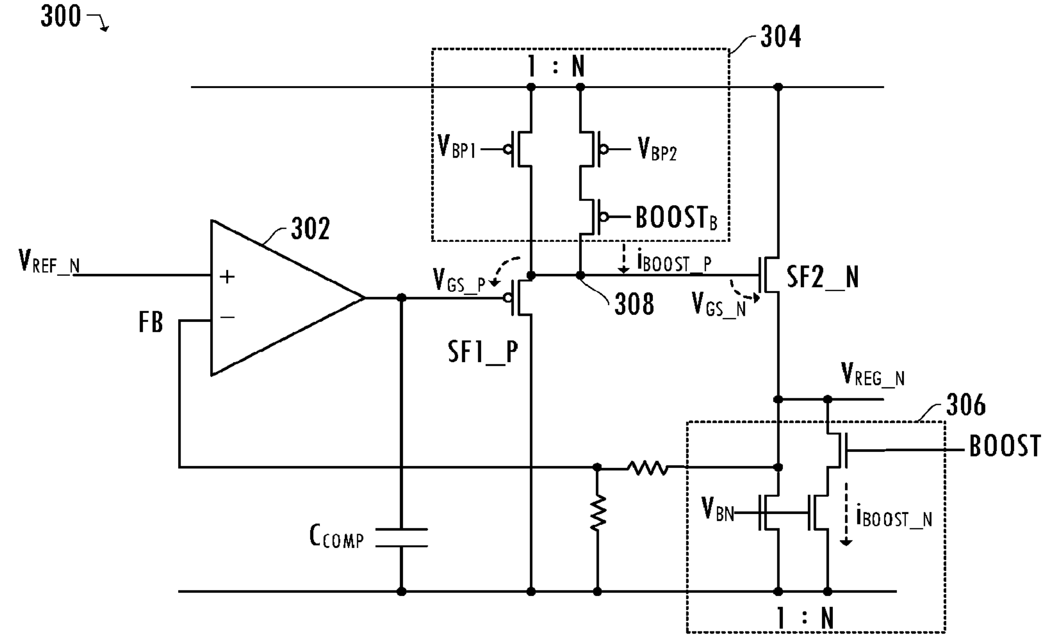
FIG. 3 illustrates an exemplary circuit diagram of a high-speed low-impedance boosting low-dropout regulator including an n-type output stage consistent with at least one embodiment of the invention.

A high-speed low-impedance boosting low-dropout regulator that maintains a stable output voltage to a load during a transient, high load condition without substantially impacting dynamic performance of the load is disclosed. The high-speed low-impedance boosting low-dropout regulator tolerates high load variation without substantial overshoot or undershoot of the regulated output voltage. Referring to FIG. 3, in at least one embodiment, high-speed low-impedance boosting low-dropout regulator 300 includes two common drain amplifiers (e.g., source follower device SF1_P having a source terminal coupled to node 308 and source follower device SF2_N having a gate terminal coupled to node 308), a load stage 306 including devices of a first type (e.g., n-type transistors), and compensation stage 304 including devices of a second type (e.g., p-type transistors). The output of operational amplifier 302 drives source follower SF1_P with a signal indicating a difference between feedback voltage FB and reference voltage signal $V_{REF\_N}$. Control signal BOOST enables load stage 306 and a high current operating point of source follower device SF2_N. In at least one embodiment, the high-current operating point is 50 to 100 times higher than a normal operating point, resulting in a reduction of the output impedance by a factor of ten. However, the high current operating point substantially changes gate-to-source voltage $V_{GS\_N}$ across source follower device SF2_N, which is an n-type transistor, resulting in an instantaneous output voltage error. Compensation stage 304 compensates for that change in gate-to-source voltage $V_{GS\_N}$ by also boosting (e.g., according to control signal BOOST_B, which is complementary to control signal BOOST) source follower device SF1_P, to generate current $i_{BOOST\_P}$ that causes a corresponding change to gate-to-source voltage $V_{GS\_P}$ across source follower device SF1_P, which is a p-type transistor (i.e., $\Delta V_{GS\_P}=\Delta V_{GS\_N}$), so that regulated output voltage $V_{REG\_N}$ does not change after enabling the boosting mode. In general, due to differences in n-type transistors and p-type transistors, current $i_{BOOST\_P}$ does not equal current $i_{BOOST\_N}$.

In a normal mode of operation (i.e., a non-boosting, standby, or lower current mode of operation), both source follower device SF1_P and source follower device SF2_N operate with a corresponding gate-to-source voltage of approximately threshold voltage $V_{TH}$. In the boosting mode of operation, the gate-to-source voltage increases, causing the current to increase by 50 to 100 times, and source follower device SF1_P and source follower device SF2_N both transition to an operating point having a significant saturation voltage $V_{DSAT}$ (i.e., a minimum drain-to-source voltage required to maintain the transistor in the saturation region of operation). Bias voltage $V_{BP1}$ determines a standby current (i.e., the current in the normal mode of operation). The standby current and the boosting current, and sizes of corresponding devices, have a ratio of 1:N (e.g., N=50 or 100). An auxiliary loop sets bias voltage $V_{BP2}$, which ensures that in the boosting mode of operation, the saturation voltages of the source followers are equal, i.e., $V_{DSATP}=V_{DSATN}$. If that condition is met, then the feedback voltage does not change in the boosting mode of operation, and the output of operational amplifier 302 is stable, thus, rendering unnecessary the fast feedback loop of the low-dropout regulator described above.

Figure 4:
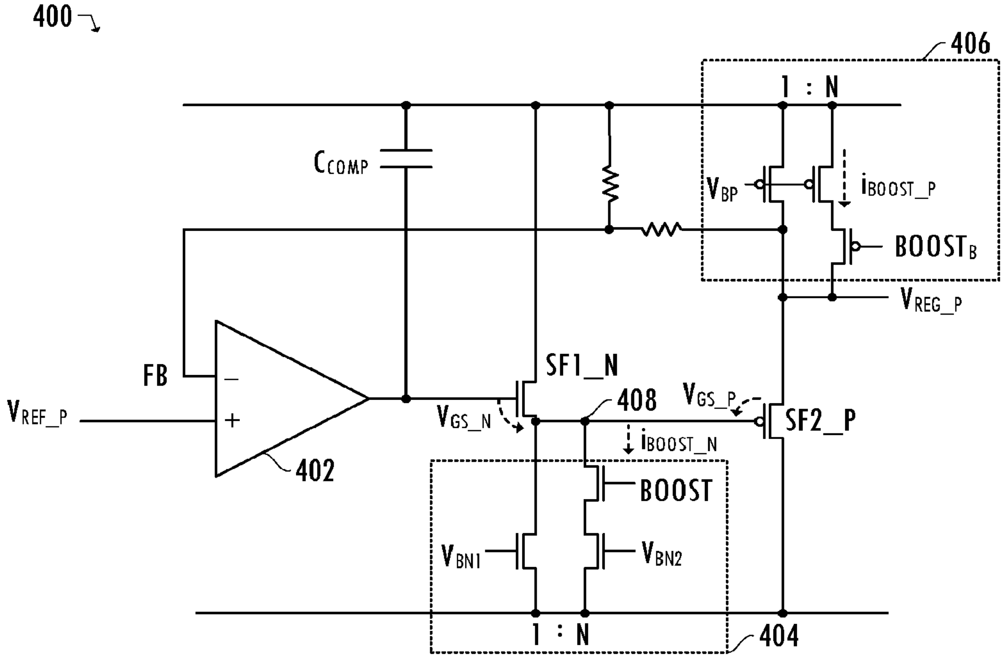
FIG. 4 illustrates an exemplary circuit diagram of a high-speed low-impedance boosting low-dropout regulator including a p-type output stage consistent with at least one embodiment of the invention.

FIG. 4 illustrates high-speed low-impedance boosting low-dropout regulator 400 having a circuit implementation that is complementary to the circuit implementation of high-speed low-impedance boosting low-dropout regulator 300 of FIG. 3 and generates regulated output voltage $V_{REG\_P}$. High-speed, boosting low-dropout regulator 400 includes two common drain amplifiers (e.g., source follower device SF1_N having a source terminal coupled to node 408 and source follower device SF2_P having a gate terminal coupled to node 408), load stage 406 including devices of the second type (e.g., p-type transistors), and compensation stage 404 including devices of the first type (e.g., n-type transistors). The output of operational amplifier 402 drives source follower SF1_N with a signal indicating a difference between feedback voltage FB and reference voltage signal $V_{REF\_P}$. Control signal BOOST_B enables load stage 406 and a high current operating point of source follower device SF2_P. The high current operating point substantially changes gate-to-source voltage $V_{GS\_P}$ across source follower device SF2_P, which is a p-type transistor, resulting in an instantaneous output voltage error. Compensation stage 404 compensates for that change in gate-to-source voltage $V_{GS\_P}$ by also boosting (e.g., using control signal BOOST) source follower device SF1_N, to generate current $i_{BOOST\_N}$ that causes a corresponding change to gate-to-source voltage $V_{GS\_N}$ across source follower device SF1_N, which is an n-type transistor (i.e., $\Delta V_{GS\_P}=\Delta V_{GS\_N}$), so that regulated output voltage $V_{REG\_P}$ does not change after enabling the boosting mode.

Figure 5:
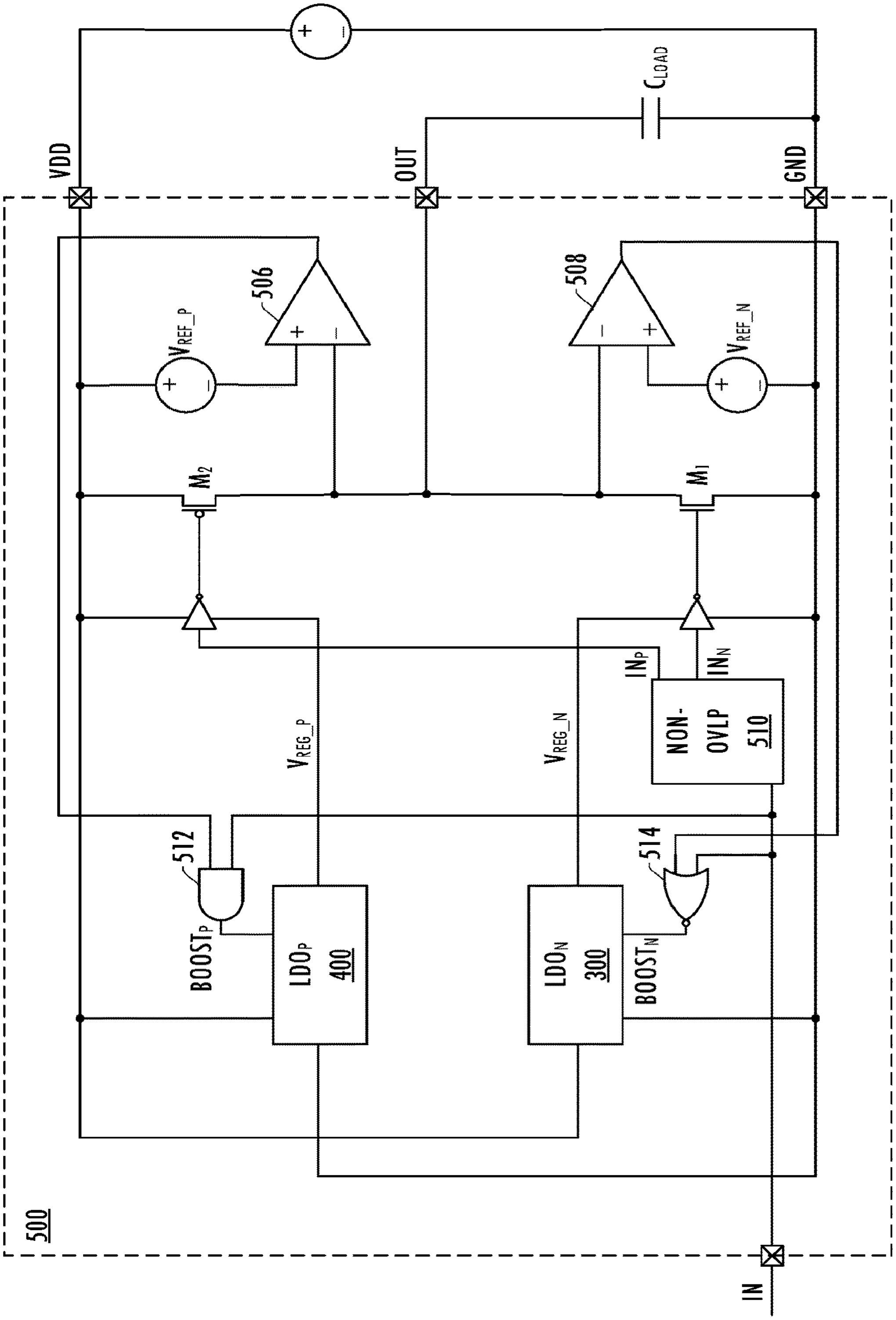
FIG. 5 illustrates an exemplary circuit diagram of the high-speed low-impedance boosting low-dropout regulator including an n-type output stage gate driver of FIG. 3 and a high-speed low-impedance boosting low-dropout regulator including a p-type output stage of FIG. 4 in an exemplary gate driver application consistent with at least one embodiment of the invention.
Figure 6:
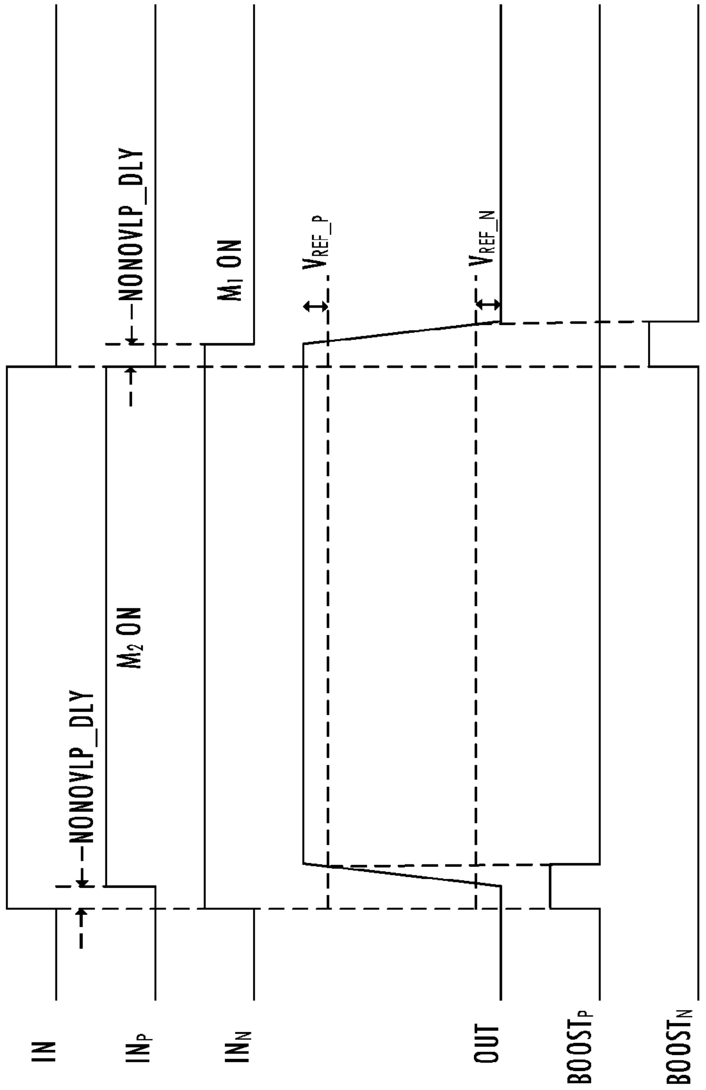
FIG. 6 illustrates exemplary timing waveforms for the circuit of FIG. 5 consistent with at least one embodiment of the invention.

FIGS. 5 and 6 illustrate an exemplary embodiment of a gate driver circuit including output transistor M1, driven using high-speed low-impedance boosting low-dropout regulator 300, and output transistor M2, driven using high-speed low-impedance boosting low-dropout regulator 400, and associated control circuitry. Output transistor M1 and output transistor M1 are coupled to drive load $C_{LOAD}$ and are driven according to input control signal IN. In at least one embodiment, circuit 500 generates control signal $BOOST_P$ and control signal $BOOST_N$ that enable the boosting modes of high-speed low-impedance boosting low-dropout regulator 400 and high-speed low-impedance boosting low-dropout regulator 300, respectively, only when needed. Circuit 500 starts the boosting in response to a transition of input control signal IN (i.e., a rising edge or a falling edge of input control signal IN) by generating control signal $IN_P$ and control signal $IN_N$, which are non-overlapping versions of the input signal that control output transistor M2 and output transistor M1, respectively.

In an exemplary embodiment, boosting begins at the transition of input control signal IN and the turn-on or turn-off of an output transistor (e.g., output transistor M2 or output transistor M1). Non-overlap circuit 510 generates a delay, which provides sufficient time for the boost control switches to turn on the boosting current in the regulator output stages. Circuit 500 disables the boosting mode of operation before the end of the transition of output signal OUT. Comparator 506 and comparator 508 detect the desaturation point of output transistor M2 and output transistor M1, respectively, by comparing the drain voltages to reference voltage $V_{REFP}$ and reference voltage $V_{REFN}$, respectively, and generating corresponding signals indicative of those comparisons that are combined with control signal $IN_P$ and control signal $IN_N$, respectively, to generate control signal $BOOST_P$ and control signal $BOOST_N$, respectively. In at least one embodiment, control signal $BOOST_P$ is generated by a logical AND of the output of comparator 506 and input control signal IN and control signal $BOOST_N$ is generated by a logical NOR of the output of comparator 508 and input control signal IN. However, in other embodiments, other logical circuits are used instead of AND gate 512 and NOR gate 514 to generate control signal $BOOST_P$ and control signal $BOOST_N$ consistent with the description above. In at least one embodiment, circuit 500 has fast current settling performance (e.g., 10-20 ns) without large on-chip capacitors (e.g., nano-Farads) or large off-chip capacitors.

Figure 7:
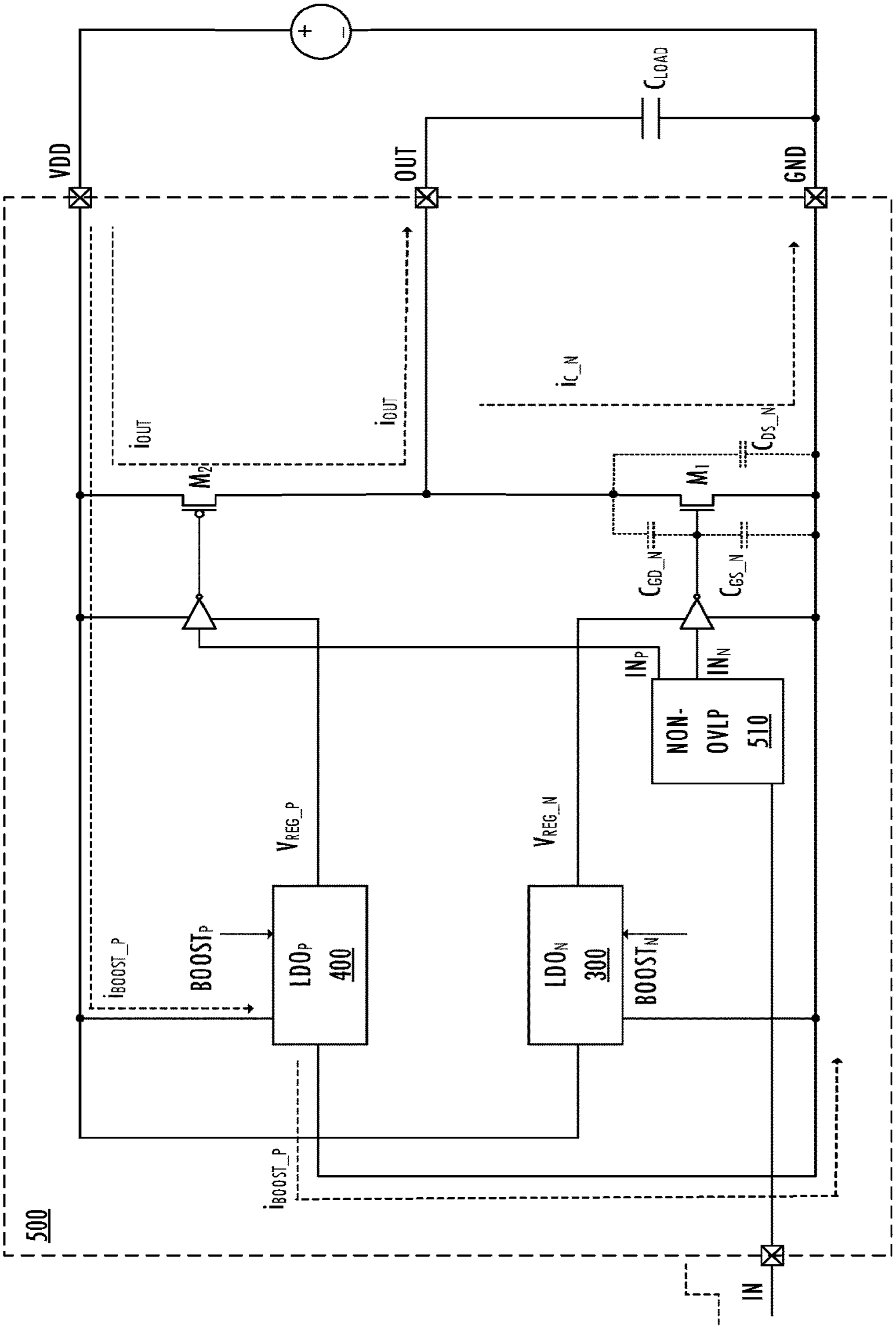
FIG. 7 illustrates an exemplary simplified circuit diagram of a boosted low-dropout regulator including a p-type output stage gate driver and boosted low-dropout regulator including an n-type output stage in the exemplary gate driver application of FIG. 5 and currents associated with a transition of the input control signal consistent with at least one embodiment of the invention.

Referring to FIG. 7, in at least one embodiment, in response to a rising edge of input control signal IN, the boosting current increases the current consumption from 1 mA to 10 mA during a transient of input signal IN of circuit 500 in the boosting mode of operation. Current $i_{BOOST\_P}$ (e.g., 10 mA) flows through both power supply nodes and can be sensed on the ground pin. Current $i_{BOOST\_P}$ ceases when the voltage on node OUT approaches the supply voltage. The output current (e.g., $i_{OUT}$=2–6 Amperes(A)) flows through only one of the power supply nodes (e.g., from node $V_{DD}$, through output transistor M2, and through node OUT). Charging of a parasitic capacitance $C_{GD\_N}$ of output transistor M1 generates current $i_{C\_N}$ that flows from node OUT and through node GND. However, using a high load capacitance (e.g., $C_{LOAD}$=100 nF) results in a low change in voltage over time at node OUT and current $i_{C\_N}$ stays below 1 mA (e.g., $i_{C\_N}$=0.5 mA), which is much less than current $i_{BOOST\_P}$.

Thus, a high-speed low-impedance boosting low-dropout regulator that provides a regulated output voltage to a load during a transient, high load condition over a short period of time without substantially impacting the dynamic performance of the load or substantial increase in average current is disclosed. The high-speed low-impedance boosting low-dropout regulator supports a low output impedance without significant overshoot or undershoot, does not need a large bypass capacitance, and may be operated without a bypass capacitance.

The description of the invention set forth herein is illustrative and is not intended to limit the scope of the invention as set forth in the following claims. For example, while the invention has been described in an embodiment in which a high-speed low-impedance boosting low-dropout regulator is implemented in a gate driver application, one of skill in the art will appreciate that the teachings herein can be utilized with other applications. The terms "first," "second," "third," and so forth, as used in the claims, unless otherwise clear by context, is to distinguish between different items in the claims and does not otherwise indicate or imply any order in time, location or quality. Variations and modifications of the embodiments disclosed herein may be made based on the description set forth herein, without departing from the scope of the invention as set forth in the following claims.

What is claimed is:

1. A voltage regulator comprising:

a differential amplifier having a first input configured to receive a reference voltage and a second input configured to receive a regulated voltage output signal from an output node via a feedback circuit;

an intermediate node between an output of the differential amplifier and the output node;

a load stage coupled between the output node and a first power supply node; and a compensation stage coupled between a second power supply node and the intermediate node, the load stage responsive to a boost control signal and the compensation stage responsive to a complementary boost control signal.

2. The voltage regulator of claim 1 wherein the voltage regulator selectively operates in one of a non-boost mode or a boost mode based on the boost control signal.

3. The voltage regulator of claim 2 wherein the boost mode has a high-current operating point that is at least one order of magnitude greater than an operating point of the non-boost mode.

4. The voltage regulator of claim 3 wherein the high-current operating point in the boost mode is at least 50 times the operating point of the non-boost mode.

5. The voltage regulator of claim 1 further comprising a first common drain amplifier between the first power supply node and the intermediate node, and having a first control node coupled to the output of the differential amplifier.

6. The voltage regulator of claim 5 wherein the first common drain amplifier comprises a p-type transistor.

7. The voltage regulator of claim 1 further comprising a second common drain amplifier coupled between the second power supply node and the output node, and having a second control node coupled to the intermediate node.

8. The voltage regulator of claim 7 wherein the second common drain amplifier comprises an n-type transistor.

9. A gate driver circuit comprising:

an input node configured to receive an input control signal;

a voltage regulator including a differential amplifier having a first input configured to receive a reference voltage and a second input configured to receive a regulated output from an output node of the voltage regulator via a feedback circuit, an intermediate node between an output of the differential amplifier and the output node, a load stage coupled between the output node and a first power supply node, and a compensation stage coupled between a second power supply node and the intermediate node, the load stage responsive to a boost control signal and the compensation stage responsive to a complementary boost control signal; and a logic circuit configured to generate the boost control signal based on at least the input control signal.

10. The gate driver circuit of claim 9 further comprising:

a first driver circuit supplied by the regulated output of the voltage regulator and responsive to a first control signal; and a first output device coupled between the first power supply node and the output node, and controlled by an output of the first driver circuit.

11. The gate driver circuit of claim 10 further comprising:

a second voltage regulator including a second load stage responsive to a second boost control signal and configured to provide a second regulated output;

a second driver circuit supplied by the second regulated output and responsive to a second control signal; and a second output device coupled between an output node of the second voltage regulator and a second power supply node of the second voltage regulator, the second output device controlled by an output of the second driver circuit.

12. The gate driver circuit of claim 11 further comprising a second logic circuit configured to generate the second boost control signal.

13. The gate driver circuit of claim 12 further comprising a non-overlap circuit configured to generate the first control signal and the second control signal based on the input control signal, the first control signal and the second control signal having non-overlapping active levels.

14. A gate driver circuit comprising:

a voltage regulator configured to provide a first output current during a first time interval and a boosted output current during a second time interval to generate a low-dropout regulated voltage signal based on a first power supply voltage, a second power supply voltage, and a reference voltage level, and further configured, during the second time interval, to compensate for a voltage drop caused by providing the boosted output current; and an output device configured to generate an output voltage based on an input control signal and using the low-dropout regulated voltage signal, and to provide the output voltage at an output node.

15. The gate driver circuit of claim 14 wherein the boosted output current is at least one order of magnitude greater than the first output current.

16. The gate driver circuit of claim 14 wherein the first output current is provided in a first mode of operation, and the boosted output current and compensation of the voltage drop are provided in a boosted mode of operation.

17. The gate driver circuit of claim 16 wherein the voltage regulator is further configured to provide a current from a first power supply node to a second power supply node in the first mode of operation, the current less than a second current provided to the second power supply node in the boosted mode of operation.

18. The gate driver circuit of claim 16 wherein the voltage regulator is further configured to enable the boosted mode of operation in response to a boost control signal.

19. The gate driver circuit of claim 18 further comprising a logic circuit configured to generate the boost control signal based on the input control signal and a feedback signal.

20. The gate driver circuit of claim 14 further comprising a second voltage regulator.

* * * * *